United States Patent Office 3,374,257
Patented Mar. 19, 1968

3,374,257
TERNARY ADDITION COMPOUNDS
David G. Walker, Baytown, Tex., assignor, by mesne assignments, to Esso Research and Engineering Company, Elizabeth, N.J., a corporation of Delaware
No Drawing. Filed Sept. 9, 1963, Ser. No. 307,325
9 Claims. (Cl. 260—448)

ABSTRACT OF THE DISCLOSURE

Ternary addition compounds of the formula: $R:HX:2AlX_3$, where R is selected from the group consisting of $C_8$, $C_9$ and $C_{10}$ methylbenzenes and X is either Cl or Br, are prepared in pure form by mixing the aromatic compound with a stoichiometric excess of anhydrous aluminum halide or hydrogen halide at a temperature between about —5° to about 30° C. The pure ternary addition compounds are heated to a temperature from about 30° to about 80° C. to allow isomerization to occur to pure ternary addition compounds whereby substantial pure meta-xylene, mesitylene, or isodurene ternary addition compounds are formed. The ternary addition compounds are hydrolyzed to produce meta-xylene, mesitylene and isodurene in substantial high purities.

The present invention is directed to ternary addition compounds of an aromatic compound, hydrogen halide and aluminum halide. More particularly, the invention is concerned with the isomerization of ternary addition compounds of the formula: $R:HX:2AlX_3$, where R is selected from the group consisting of $C_8$, $C_9$ and $C_{10}$ methylbenzenes and X is either Cl or Br. In its more specific aspects the present invention is directed to a method whereby $C_8$, $C_9$ and $C_{10}$ methylbenzenes may be isomerized to obtain meta-xylene, mesitylene and isodurene, respectively, in amounts substantially greater than in a thermodynamic isomerization.

The present invention may be briefly described as a method for producing a substantially pure ternary addition compound for the formula: $R:HX:2AlX_3$, where R is selected from the group consisting of $C_8$, $C_9$ and $C_{10}$ methylbenzenes and X is either Cl or Br. It has been found that a substantially pure ternary addition compound may be formed by mixing one of the $C_8$, $C_9$ or $C_{10}$ methylbenzenes with a stoichiometric excess of a hydrogen halide and aluminum halide where the halide is either Cl or Br at a temperature between about —5° to about 30° C. It has further been found, according to the present invention, that the substantially pure ternary addition compounds may be isomerized by heating to a temperature between about 30° to about 80° C. in the absence of any free aromatics.

It is known that an aromatic compound selected from the group consisting of $C_8$, $C_9$ and $C_{10}$ methylbenzenes may be isomerized. However, the thermodynamic equilibrium between the respective isomers of the methylbenzenes prevents any one isomer being formed in the isomerization reaction above about 60% of the entire mixture of isomers. Furthermore, in known isomerization methods transalkylation takes place and often at a greater rate than the desired isomerization. Thus, heretofore it has been impossible to obtain by isomerization any one isomer of the $C_8$, $C_9$ and $C_{10}$ methylbenzenes in substantially pure form.

In the practice of the present invention the ternary addition compounds are produced in substantially pure form by mixing an aromatic compound selected from the group consisting of $C_8$, $C_9$ and $C_{10}$ methylbenzenes with a stoichiometric excess of HCl or HBr and an aluminum halide where the halide is either Cl or Br at a temperature between about —5° to about 30° C. A preferred manner of preparing the ternary addition compounds is to mix the aromatic compound with an anhydrous aluminum halide powder at room temperature. The mixture is stirred well, and anhydrous hydrochloric or hydrobromic acid is allowed to bubble through the mixture. It is necessary to provide a stoichiometric excess of both hydrogen chloride or hydrogen bromide and aluminum chloride or aluminum bromide to insure all that the aromatic compound will be reacted.

The substantially pure ternary addition compounds of the formula $R:HX:2AlX_3$ where R is selected from the group consisting of $C_8$, $C_9$ and $C_{10}$ methylbenzenes and X is either Cl or Br are, according to the present invention, isomerized by heating to a temperature between about 30° to about 80° C. The isomerization of the ternary addition compounds goes quite smoothly to substantially pure ternary addition compounds of the respective isomers. The $C_8$ methylbenzene:$HX:2AlX_3$ ternary addition compounds are isomerized to meta-xylene:$HX:2AlX_3$; the $C_9$ methylbenzene:$HX:2AlX_3$ ternary addition compounds are isomerized to mesitylene:$HX:2AlX_3$; and the $C_{10}$ methylbenzene:$HX:2AlX_3$ ternary addition compounds are isomerized to isodurene:$HX:2AlX_3$ where X is either Cl or Br. The isomerization method is carried out in the absence of any free aromatic compounds. It has been found that if the isomerization process is carried out with substantially pure ternary addition compounds of the $C_8$ to $C_{10}$ methylbenzenes with HCl or HBr and aluminum chloride or aluminum bromide and in the absence of any free aromatic compounds, there is substantially no catalytic activity and substantially pure meta-xylene, mesitylene or isodurene ternary addition compounds are formed. Furthermore, there is almost a negligible amount of transalkylation which takes place upon heating the pure ternary addition compounds of the present invention. A preferred range of temperatures for carrying out the isomerization is between about 50° to about 60° C. Within the preferred temperature limits the purity of the isomerized ternary addition compounds are maximized.

While the breaking of the meta-xylene, mesitylene or isodurene ternary addition compounds formed, according to the present invention, is not specifically a part of the invention, it is pointed out that the breaking of the ternary addition compound by hydrolysis, for example, yields the aromatic compound, namely, meta-xylene, mesitylene and isodurene in substantial high purities. In fact, purities in excess of 96% may be obtained by the simple separation of impurities of aromatics of other carbon numbers.

The present invention is further illustrated by the following examples which are set forth for illustration and are not to be considered as limiting the present invention.

*Example 1*

Pseudocumene (86 g., 0.715 mol) of 98+% purity is mixed with a stoichiometric excess of aluminum chloride anhydrous powder (212 g., 0.800 mol) in a 3-neck flask equipped with a stirrer. The mixture is stirred vigorously at room temperature, and anhydrous hydrochloric acid is bubbled through the mixture. After two hours at room temperature, no more hydrochloric acid is absorbed. The liquid phase formed is substantially pure pseudocumene:$HCl:2AlCl_3$. This ternary addition compound may be recovered by decanting the liquid phase from the excess solid aluminum chloride.

The foregoing example illustrates the method of preparing a ternary addition compound of the present invention. It is pointed out that aluminum bromide and hydrogen bromide may be substituted for aluminum chloride and the anhydrous hydrochloric acid of the foregoing example. The method is the same for any of the isomers of the $C_8$, $C_9$ and $C_{10}$ methylbenzenes and applies equally when a mixture of isomers is prepared.

Example II

Pseudocumene (86 g., 0.715 mol) 98+% purity is mixed with aluminum chloride anhydrous powder (212 g., 0.800 mol) in a 3-neck flask equipped with a stirrer. The mixture is vigorously stirred at room temperature while bubbling anhydrous hydrochloric acid through the mixture. After 2 hours, no more hydrochloric acid is absorbed while maintaining the temperature at room temperature. The flask is then heated to 50° to 60° C. and the temperature maintained for 4 hours with continual stirring and slow bubbling of hydrogen chloride through the mixture at atmospheric pressure. The resulting liquid phase is then decanted from the excess solid aluminum chloride. Upon hydrolysis of the liquid phase, the liquid phase yielded an organic material of the following analysis: benzene, 0.1%; toluene, 1.0%; xylene, 4.9%; mesitylene, 84.3%; pseudocumene, 1.3%; indane, 0.4%; and isodurene, 8.5%. It is to be noted that mesitylene and pseudocumene are the only $C_9$ aromatics present. Accordingly, mesitylene may be recovered in purities in excess of 96% by simple distillation.

It is to be noted that the hydrolysis of the ternary addition compound of the aromatic HCl and aluminum chloride allows the recovery of the aromatic phase and allows separation thereof from the hydrogen chloride and aluminum chloride which goes into the aqeuous phase. Analysis of the organic aromatic is an easy means for proving the structure of the ternary addition compounds.

Example III

Durene (500 g., 3.72 mols) of 99+% purity is mixed with an excess aluminum chloride powder (1060 g., 4.00 mols) in a flask equipped with a stirrer. The mixture is vigorously stirred at 0° C. with 100 ml. benzene as a solvent while bubbling through the mixture, anhydrous hydrochloric acid. The mixture is maintained at 0° C. until no more hydrochloric acid is absorbed. The flask is then heated to about 60° C. and maintained for several hours with continual stirring and continual bubbling of HCl therethrough at atmospheric pressure. The resulting liquid phase is decanted from the excess solid aluminum chloride and thoroughly mixed with water. An analysis of the organic material follows: benzene, small amount not analyzed; $C_9$ and $C_{11}$ aromatics, <5%; and $C_{10}$ aromatic, 95+%. of the $C_{10}$ aromatics analyzed the following were found: isodurene, 98%; durene and prehnitene, <2%.

Example IV

A mixture of the $C_9$ methylbenzenes is mixed with solid aluminum chloride in a flask equipped with a stirrer. Anhydrous hydrochloric acid is bubbled through the mixture at about 0° C. The hydrochloric acid is continually bubbled through the mixture until no more is absorbed. The temperature during the addition of the hydrochloric acid is maintained substantially uniform. The flask is then heated to a temperature of about 50° to 60° C. and maintained for 2 hours. The mixture is continually stirred, and hydrogen chloride at atmospheric pressure is continually bubbled through the mixture. The resulting liquid phase is decanted from any excess solid aluminum chloride and is thoroughly mixed with water. Upon hydrolysis, the aromatic materials are separated from HCl and aluminum chloride; and the analysis of the aromatic is substantially the same as given in Example I.

The nature and objects of the present invention having been completely described and illustrated and the best mode contemplated set forth, what I wish to claim as new and useful and secure by Letters Patent is:

1. A method for producing ternary addition compounds of the formula, $R:HX:2AlX_3$, where R is selected from the group consisting of $C_8$, $C_9$, and $C_{10}$ methylbenzenes and X is selected from the group consisting of Cl and Br which comprises mixing an aromatic compound selected from the group consisting of $C_8$, $C_9$ and $C_{10}$ methylbenzenes with a stoichiometric excess of an anhydrous aluminum halide and anhydrous hydrogen halide at a temperature between about −5° to about 30° C., wherein said halide is selected from the group consisting of chlorine and bromine.

2. A method in accordance with claim 1 wherein said aromatic compound is mixed with a stoichiometric excess of aluminum chloride and HCl.

3. A method in accordance with claim 1 wherein said aromatic compound is mixed with a stoichiometric excess of aluminum bromide and HBr.

4. An isomerization method which comprises warming a ternary addition compound of the formula, $R:HX:2AlX_3$, where R is selected from the group consisting of $C_8$, $C_9$ and $C_{10}$ methylbenzenes and X is selected from the group consisting of Cl and Br at a temperature between about 30° to about 80° C. whereby the $C_8$ methylbenzene: $HX:2AlX_3$ ternary addition compounds are isomerized to mita-xylene: $HX:2AlX_3$; the $C_9$ methylbenzene:HX: $2AlX_3$ ternary addition compounds are isomerized to mesitylene:$HX:2AlX_3$; and the $C_{10}$ methylbenzene:HX: $2AlX_3$ ternary addition compounds are isomerized to isodurene:$HX:2AlX_3$.

5. A method in accordance with claim 4 wherein the temperature is between about 50° to about 60° C.

6. A method in accordance with claim 4 wherein said ternary addition compounds are warmed essentially in the absence of any free aromatics.

7. An isomerization method which comprises warming a ternary addition compound of the formula, $R:HCl: 2AlCl_3$, where R is selected from the group consisting of $C_8$, $C_9$ and $C_{10}$ methylbenzenes at a temperature between about 30° to about 80° C. whereby the $C_8$ methylbenzene:$HCl:2AlCl_3$ ternary addition compounds are isomerized to meta-xylene:$HCl:2AlCl_3$; the $C_9$ methylbenzene:$HCl:2AlCl_3$ ternary addition compounds are isomerized to mesitylene:$HCl:2AlCl_3$; and the $C_{10}$ methylbenzene: $HCl:2AlCl_3$ ternary addition compounds are isomerized to isodurene:$HCl:2AlCl_3$.

8. An isomerization method which comprises warming a ternary addition compound of the formula, $C_9$ methylbenzene:$HCl:2AlCl_3$ at a temperature between about 50° to about 60° C. whereby said compound is isomerized to mesitylene:$HCl:2AlCl_3$.

9. A method in accordance with claim 8 wherein said $C_9$ methylbenzene is pseudocumene.

References Cited

Chemical Abstracts (I), vol. 55, pg. 16453f (1961).
Chemical Abstracts (II), vol. 51, pg. 1050g (1957).
Norris et al.: "J. Amer. Chem. Soc.," vol. 62, pp. 1298–1301 (1940).
Thomas: Anhydrous Aluminum Chloride in Organic Chemistry, Reinhold Publ. Corp., N.Y., pp. 99, 712, 715, 717, 718 (1941).

TOBIAS E. LEVOW, *Primary Examiner.*

HELEN M. McCARTHY, *Examiner.*

H. M. S. SNEED, *Assistant Examiner.*